3,088,578
FRUIT HANDLING APPARATUS
Paul C. Wilbur, San Jose, and Leslie Vadas, Los Gatos, Calif., assignors to FMC Corporation, a corporation of Delaware
Filed Jan. 23, 1961, Ser. No. 84,142
17 Claims. (Cl. 198—33)

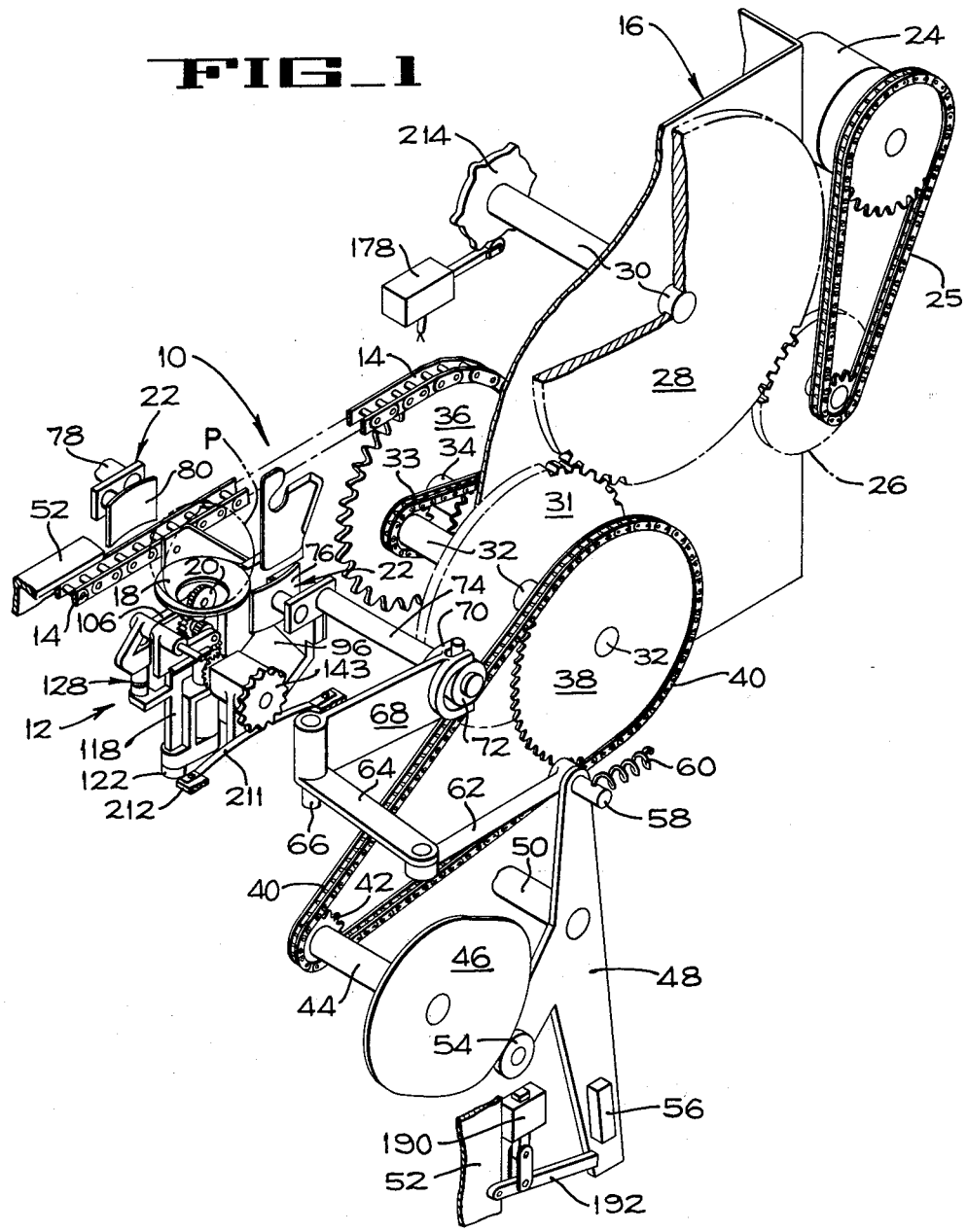

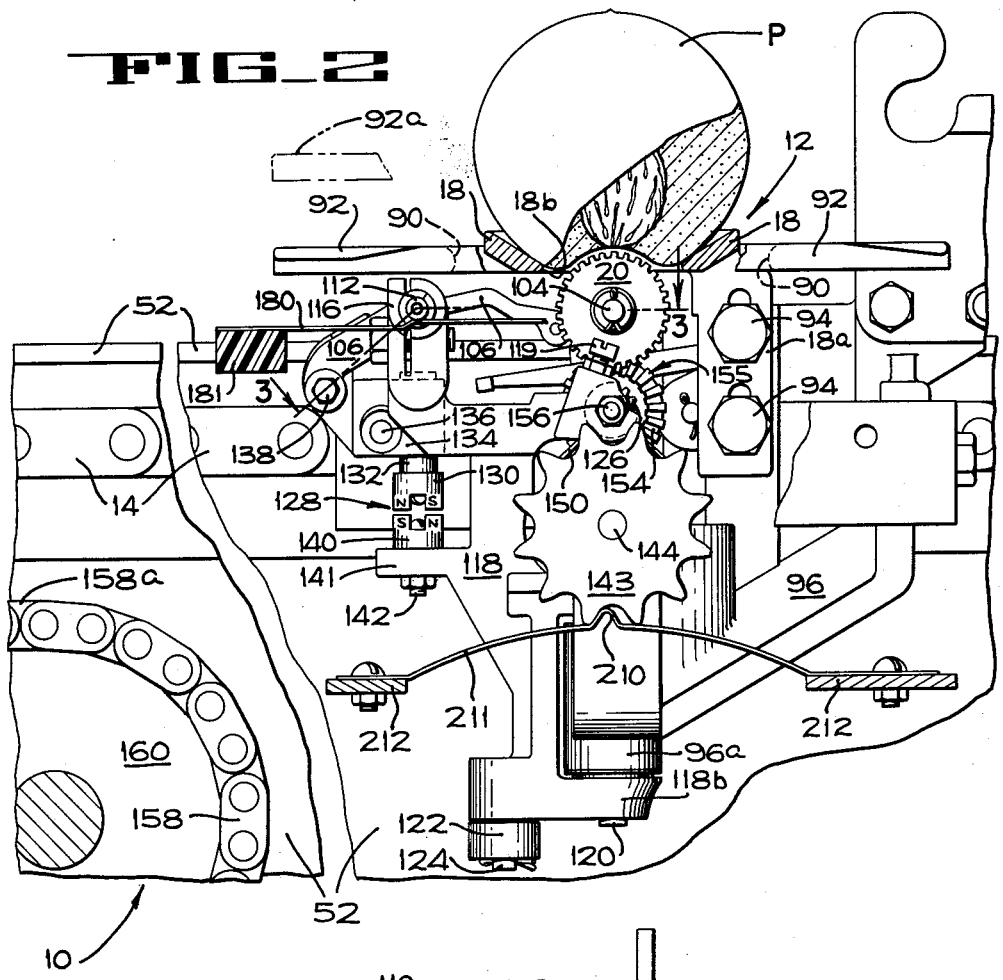

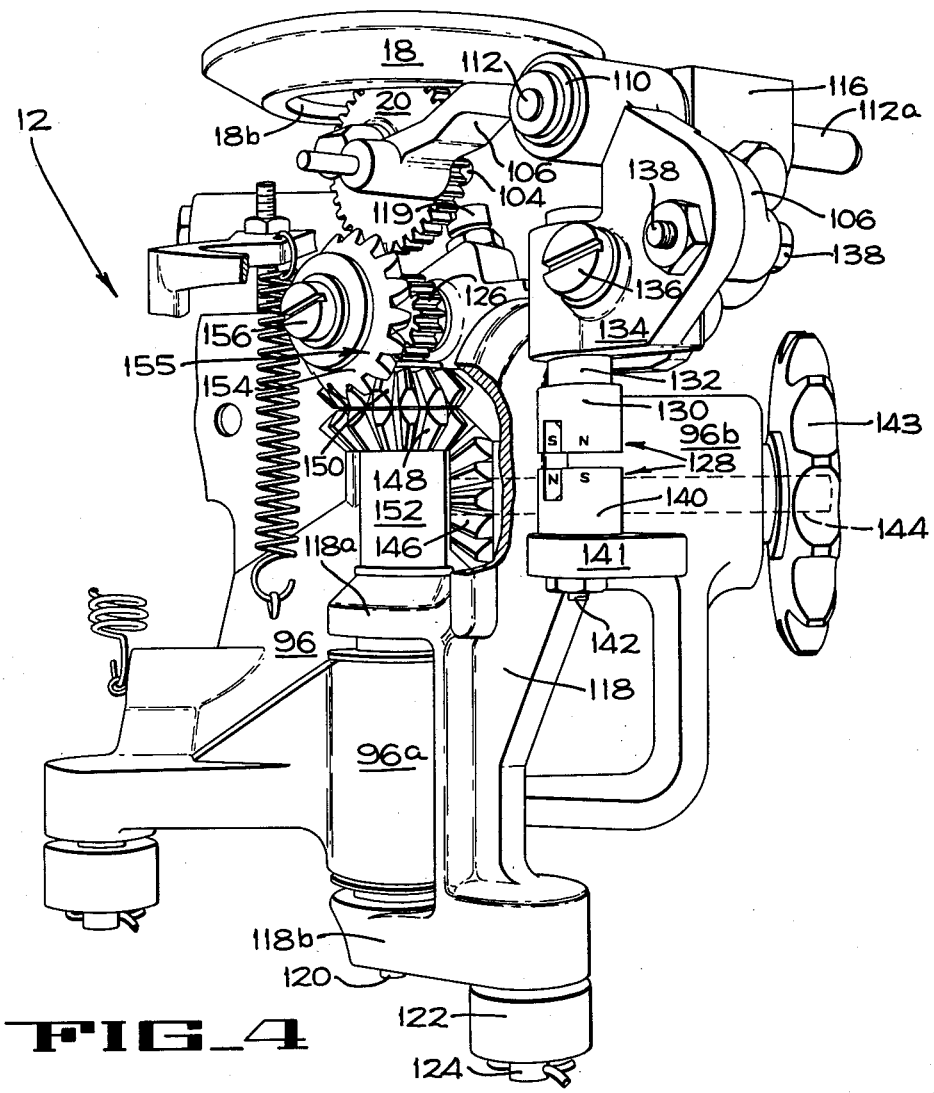
FIG_4
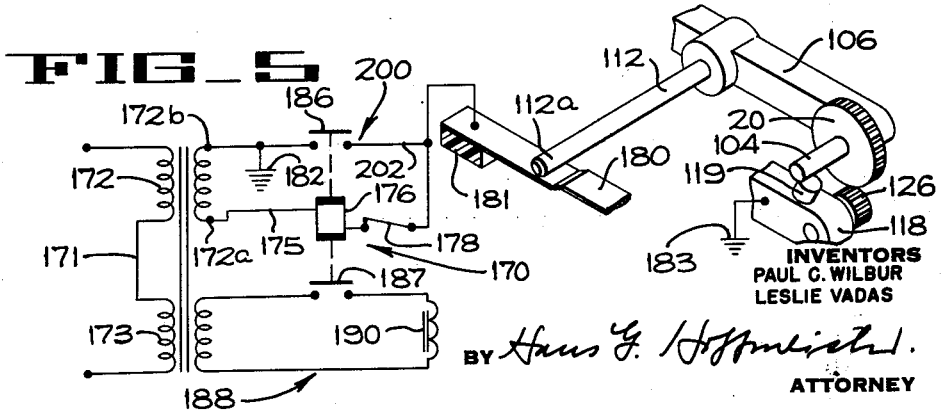
FIG_5
INVENTORS
PAUL C. WILBUR
LESLIE VADAS
BY Hans G. Hoffmichel
ATTORNEY United States Patent Office 3,088,578
Patented May 7, 1963

This invention relates to fruit handling equipment and more particularly concerns improved reject systems for use in connection with fruit orienting equipment.

An object of the present invention is to provide an improved reject system for a machine that orients fruit according to stem indent and suture plane.

Another object of the present invention is to provide an improved arrangement for disabling the reject mechanism of fruit aligning apparatus to permit uninterrupted progress of properly aligned fruit through the apparatus.

Another object of this invention is to provide means for ensuring completion of an electrical connection between two relatively movable members included in an electric circuit used in fruit handling apparatus.

Another object of the invention is to provide an inexpensive device for positively turning one of two enmeshed gears to ensure one being properly enmeshed with the other and thus moved into position to effect completion of an electric circuit.

Another object of the invention is to provide a device for maintaining an electric circuit closed for a predetermined time during operation of a reject system in a fruit orienting machine.

Another object of the invention is to provide an improved carriage for a fruit handling apparatus.

Another object of the invention is to provide an improved drive for the indent finder wheel of a fruit orienting machine.

Another object is to provide an indented-fruit orienting machine including an indent finder and improved rapidly operating means for moving the finder into the indent of an oriented fruit.

These and other objects and advantages of the invention will be apparent from the following description and the accompanying drawings, wherein:

FIG. 1 is a fragmentary diagrammatic perspective of a fruit handling apparatus including parts of the reject system of the present invention, and showing part of a pitter mechanism to which properly oriented fruit is supplied by the handling apparatus.

FIG. 2 is a side elevation of a fruit carriage constituting one of the components of the handling apparatus of FIG. 1.

FIG. 3 is a section along line 3—3 of FIG. 2.

FIG. 4 is a perspective of the fruit carriage viewed from the rear.

FIG. 5 is a diagram of the electric circuit associated with the reject system of the invention.

The present invention concerns improvements in fruit handling equipment such as the fruit handling machine disclosed in the United States patent application of John Boyce et al., Serial No. 785,414, now Patent No. 3,003,610. The following description discloses the reject system of the present invention installed as an operating component of the fruit handling machine of the Boyce application.

A part of the fruit handling machine of the above-identified application is indicated herein at 10 in FIG. 1, and is described herein as operating upon peaches, with the understanding, however, that it is capable, with or without modification, of handling other fruit characterized by a stem indent. The machine 10 includes a plurality of fruit carriages 12 which are advanced through the machine 10 on a chain conveyor 14 toward a pitter mechanism 16. Since the carriages 12 are all the same and all operate in the same manner, only one carriage is shown and described herein. Loading mechanism (not shown) places a peach P on a dish-shaped support ring 18 rigid with the carriage 12, and as the carriage is advanced, a finder wheel 20 is rotated while in contact with the peach in a surface-scanning operation which brings the stem indent of the peach into registration with the finder wheel. When this registration of the stem indent with the finder wheel is achieved, the peach is said to be "oriented." The finder wheel then enters the indent and is oscillated rapidly about a vertical axis to cause the elongate indent to become aligned with the finder wheel and thus bring the longer axis of the ident into approximate alignment with the plane of the finder wheel. Since the longer axis of the indent lies within the suture plane of the fruit such oscillation aligns the fruit suture plane with the plane of the finder wheel. When this alignment of the suture plane is achieved, the peach is said to be "aligned."

If the peach is oriented as it reaches a transfer mechanism 22, the transfer mechanism grasps the peach and moves it into a position for advancement into the pitter mechanism 16, where a circular saw bisects both the flesh and pit of the peach. It is the function of the reject system of the present invention to disable the transfer mechanism before an improperly oriented peach reaches the transfer mechanism, thus to permit the unoriented peach to continue past the transfer mechanism on its carriage so that the peach can be returned to the loading mechanism of the fruit orienting machine 10 for recycling.

The fruit handling machine 10 is driven by a motor 24 (FIG. 1) through a chain and sprocket drive mechanism 25, a gear 26, and a large gear 28 secured to the main drive shaft 30 of the pitter mechanism 16. The large gear 28 is enmeshed with a gear 31 rigid with a shaft 32 that actuates a chain and sprocket drive mechanism 33 which rotates a shaft 34 and a sprocket 36 that drives the carriage advancing chain 14. The shaft 32 also drives a sprocket 38 which through a chain 40 and a sprocket 42 rotates a shaft 44 which carries a large cam 46 constistituting a part of the transfer mechanism 22.

A lever 48 is secured to a shaft 50 that is mounted on the frame 52 of the machine 10. The lever 48 carries a cam follower roller 54, a stop block 56 on the lower end of the lever, and a pivot pin 58 extending through and projecting from both sides of the upper end thereof. A spring 60 connected to one end of the pin 58 urges the lever 48 to rock clockwise (as viewed in FIG. 1) about the axis of the shaft 50 to hold the roller 54 to the cam 46. A link 62 is pivotally connected to the other end of the pin 58 and to one arm of a bellcrank 64. The bellcrank 64 is pivotally mounted on a fixed vertical pin 66 and its other arm 68 carries a yoke 70 that engages a collar 72 on the outer end of a transfer shaft 74 which carries a fruit gripping jaw 76 on its inner end.

Another lever (not shown), similar to the lever 48, is secured to the shaft 50 at the opposite side of the machine 10 and this other lever operates mechanism equivalent to the bellcrank 64 to advance a second transfer shaft 78 which carries a second fruit gripping jaw 80. The jaws 76 and 80 are aligned transversely of the machine in spaced apart, opposed relation. As a peach on the carriage 12 approaches the space between the jaws, sensing apparatus determines its orientation so that if the peach is properly oriented it will be grasped by the jaws and shifted thereby to a position for transfer to the pitter mechanism 16, but if the peach is not oriented the transfer mechanism 22 is disabled, causing the peach to be recycled through the machine, as explained in the aforesaid application Serial No. 785,414.

During advancement of the peach on the fruit carriage 12, the fruit lies within the center opening 90 of a vertically reciprocable horizontal plate 92 and rests on the upper surface of the support ring 18. The flat plate 92 is repeatedly moved by a cam surface (not shown) between the solid line position and the broken line position 92a shown in FIG. 2 and this movement of the plate 92 causes fruit of irregular shape that may come to rest against the edge of the center opening 90 to be moved to the center of the ring 18 for continuation of the surface-scanning operation. The support ring 18 is carried by a support arm 18a adjustably fastened by capscrews 94 to the body 96 of the carriage. The finder wheel 20 projects upward through central opening 18b in the support ring 18 and is journalled in bearings 102 (FIG. 3) mounted on a shaft 104 which is fixed in the end of a finder arm 106 and extends to one side thereof. A transverse bore 108 in the finder arm 106 contains two bearings 110 that pivotally mount the arm 106 on an elongate pivot pin 112. The pivot pin 112 is tightly secured in a bushing 114 clamped in a split collar 116 which forms a part of a finder-swinging bracket 118 (FIGS. 2 and 4) of the carriage 12. The finder-swinging bracket 118 carries an adjustable stop screw 119 which underlies the end of the shaft 104 and limits downward movement of the arm 106 and the finder wheel 20 carried thereby. The finder-swinging bracket 118 is hinged to the rear side of the body 96 of the carriage 12 on a vertical shaft 120 that is secured in a cylindrical boss 96a of the body 96. The shaft 120 is received in short bearing arms 118a and 118b projecting forward from the bracket 118. A cam-follower roller 122 rotatably mounted on a short vertical shaft 124 of the finder-swinging bracket 118 engages an elongate sinuous cam (not shown) mounted on the frame 52 of the machine 10 that causes the bracket 118 to oscillate rapidly through an arc of approximately 120° about the vertical axis of the shaft 120 as the chain 14 advances the carriage 12 toward the pitter mechanism 16.

The finder wheel 20, its bearings 102, the finder arm 106, its bearings 110, and the pivot pin 112 are all of electrically conductive material and are in series connection with each other in an electric circuit constituting a part of the reject system of the invention, as will presently be explained. However, these parts are electrically isolated from the other parts of the carriage 12, since the bushing 114 whereby the pivot pin 112 is mounted on the bracket 118 is of dielectric material such as nylon.

To enable the fruit handling machine 10 in which the present invention is embodied, to orient peaches to place the stem indent of each peach down, a portion of the weight of the peach is supported by the finder wheel 20, which is a spur gear provided with gear teeth throughout its periphery. When a peach is improperly oriented, the weight of the fruit on the finder wheel presses the finder wheel down, causing its teeth to enmesh with the teeth of a driving spur gear 126. The driving gear 126 is driven during a first portion of the travel of the carriage 12 by mechanism presently to be described, and causes the teeth on the finder wheel 20 to rotate the peach within the support ring 18. The finder wheel 20 progressively scans the surface of the peach in a manner that usually brings the stem indent to the underside of the fruit, in registry with and directly over the finder wheel 20. When this orientation is achieved, the finder wheel 20 rises into the indent of the peach and in doing so it becomes disengaged from its drive gear and thus ceases to rotate.

In accordance with the present invention, the finder wheel 20 is urged upward against the peach surface for causing the finder wheel to rise into the indent when the indent has been found, by a pair of permanent magnets 128 (FIGS. 2 and 4). The magnet 130 of this pair is secured to a nylon plug 132 which is adjustably clamped by a bolt 136 in a split-collar member 134 that is secured to the finder arm 106 by a bolt 138. The other magnet 140 of said pair is located in opposition to the magnet 130 on a short platform 141 extending from the finder-swinging bracket 118 and is fixed to the platform by a brass bolt 142. The poles of the magnets 130 and 140 are spaced apart by a narrow air-gap and the north and south poles of the magnets are located so that adjacent poles attract each other as will be apparent from the north and south pole notation seen in FIG. 2. A strong attraction exists between the poles when they are in the relative positions shown in FIG. 2, this being the position which they occupy when the finder wheel 20 is raised into the stem indent.

When the finder wheel 20 is depressed by an unoriented peach, the magnet 130 is swung a short distance about the axis of the pivot pin 112 and to the left as viewed in FIG. 2. This pivotal movement of one magnet causing it to move laterally relative to the other magnet separates the opposite unlike poles of the magnets a short distance and thus reduces the force of attraction between them. However, this same movement brings one pair of like poles of the magnets progressively closer to each other until the finder wheel engages driving gear 126, and this increases the force of repulsion between these two poles. Throughout the range of movement of the arm 106, therefore, there exists a force which tends to bring the magnets to their centered position with unlike poles opposite each other, as shown in FIG. 2. Thus, this force will constantly tend to raise the finder wheel so that it will rise easily into the stem indent upon registry therewith.

A further desirable feature of the magnets 128 is that the air-gap between the poles of the magnets insulates the magnet 130 on the arm 106 from the other magnet and consequently the magnets do not establish a path for current flow between the finder arm 106 and the remainder of the carriage 12. The importance of this advantage of the magnets over the spring type of force exerting arrangement shown in the aforesaid application Serial No. 785,414 is that they do not disturb the above mentioned electric isolation of the finder wheel 20, finder arm 106, and pivot pin 112 from the remainder of the fruit carriage 12.

The finder wheel driving gear 126 is driven by a sprocket 143 secured to a shaft 144 rotatably mounted in a boss 96b of the carriage body 96. The shaft 144 carries a bevel gear 146 on its inner end that engages the lower one of two bevel gears 148 and 150 both of which are rigid with a collar 152. The collar 152 is mounted for rotation on the upper end of the vertical shaft 120. The upper bevel gear 150 is engaged to drive a bevel gear 154 that is integrally formed with the finder wheel driving gear 126 to provide a gear unit 155. The gear unit 155 is rotatably mounted on a short horizontal shaft 156 that is fixed in the finder-swinging bracket 118 so that the axis of shaft 156 intersects the axis of the shaft 120. It will be apparent that the bevel gear 154 oscillates about the shaft 120 as the bracket 118 swings left and right, but the bevel gear 154 nevertheless maintains its driving engagement with the bevel gear 150.

The sprocket 143 is caused to rotate and thus impart rotation to the finder wheel driving gear 126, by means of a sprocket chain, a part of which is shown at 158 in FIG. 2. This chain includes a straight run 158a with which the sprocket 143 is enmeshed as the associated fruit carriage progresses through approximately the first half of its travel from the loading mechanism to the pitting machine 16. Instead of being mounted in fixed relation with the frame 52 of the machine 10, however, the chain 158 is carried by spaced apart sprocket gears, one of which is indicated at 160, which rotate while the machine 10 is in operation, so as to move the run 158a of the chain in the direction of carriage movement. Thus, the driving gear 126 is driven at the speed that imparts the optimum rate of rotation to the finder wheel 20 to perform its indent finding operation most efficiently, as fully explained in the aforesaid application Serial No. 785,414.

Since the straight run 158a of chain 158 terminates at the sprocket 160 which, as stated, is located approximately midway along the path of travel of the carriages 12 between the loading mechanism and the pitter mechanism 16, the driving gear 126 and the finder wheel rotate only during approximately the first half of the fruit advancing movement of the carriage. In most instances the fruit on the carriage will be properly oriented before the sprocket leaves the chain 158, and when the carriage reaches the transfer mechanism, the two transfer cups 76 and 80 grasp the fruit and transfer it to the pitter mechanism. A small percentage of the fruit, however, will not be oriented as they approach the transfer mechanism and a transfer mechanism disabling device is provided to prevent transfer of an unoriented fruit to the pitter mechanism 16.

The disabling device includes a disabling circuit 170 (FIG. 5) powered by a transformer 171 which includes two secondary windings 172 and 173, respectively. One terminal 172a of the secondary winding 172 is connected by a lead 175 to a relay 176 that is connected in series through a normally closed switch 178 to a contact strip 180 mounted on a block 181 of insulating material in position for the projecting end 112a of the elongate pivot pin 112 to make sliding engagement with the strip 180 a brief interval before the carriage 12 reaches the transfer mechanism. As above explained, the pin 112 is in electrical connection with the finder wheel 20, and when the finder wheel 20 is held down by an improperly oriented peach the shaft 104 engages and makes electrical contact with the stop screw 119. Since the stop screw 119 is screwed into the bracket 118, it is electrically grounded to the frame 52 of the machine as indicated at 183 in FIG. 5. Therefore, even though the driving gear 126 also is electrically grounded to the frame the screw 119 provides a more dependable electrical connection between the finder wheel 20 and the frame 52 when the finder is in its lowest position than does the driving gear 126 because backlash between the finder wheel and its driving gear is apt to interfere with current flow therebetween. Therefore, when the pin 112 engages the contact strip 180, the disabling circuit 170 including the winding of the solenoid 176 is completed, it being understood that the other terminal 172b of the secondary transformer winding 172 is grounded, as indicated at 182.

Thus, engagement of the shaft 104 with the stop screw 119 as a consequence of improper orientation of a fruit, conditions the circuit 170 for subsequent energization when the pivot pin 112 makes contact with the strip 180.

Completion of the circuit 170 causes the relay 176 to be energized and close two switches 186 and 187, respectively, of the relay. The switch 187 is in a circuit 188 that includes another secondary winding 173 of the transformer 171 having a higher voltage output than the winding 172. The circuit 188 also includes a disabling solenoid 190. Closure of the switch 187 by the relay 176 energizes the solenoid 190, causing it to move a detent 192 (FIG. 1) into the path of the hereinbefore mentioned stop block 56 on the lever 48. When in this position, the detent 192 blocks movement of the lever 48 and prevents the lever 48 from following the cam 46 and operating the transfer mechanism 22.

Occasionally, vibration of the strip 180 and the pivot pin 112 occurs which causes the contact therebetween to be made and broken rapidly several times. This is apt to cause the relay 176 to "chatter," i.e., to be energized and deenergized several times in a brief time period. Chattering of the relay 176 causes the contacts of the switch 187 to vibrate open and shut and causes the solenoid 190 to operate erratically. Another frequently encountered cause of undependable operation of the disabling circuit 170 at a critical time in the machine's operating cycle results from rolling of an unoriented peach back and forth on the support ring 18 of the advancing carriage. This is apt to permit the finder wheel to rise momentarily and thus break the connection between the shaft 104 and the stop screw 119 and likewise cause the relay 176 to chatter and effect erratic operation of the solenoid 190. Such occasional erratic operation is eliminated by a holding circuit 200 (FIG. 5) for the relay 176 which includes the switch 186 and a lead 202 connected into the circuit 170 between the switch 178 and the sliding contact strip 180. Energization of the relay 176 closes the switch 186 which maintains the relay energized until the switch 178 is opened in a manner presently to be explained.

It sometimes happens that although an unoriented peach presses the finder gear 20 down as the carriage approaches the location in the machine where the pivot pin 112 contacts the strip 180, the top of a tooth on the finder wheel 20 rests on the top of a tooth of the driving gear 126. When this condition obtains, the shaft 104 fails to engage the stop screw 119, and there is enough resistance to current flow through the contacting tops of the gear teeth and through the bearings 102 (FIG. 3) to prevent energization of the relay 176. In other words, the finder wheel can be depressed by an unoriented fruit and the circuit 170 not energized at the instant when the disabling circuit should be energized. Means are provided for turning the gear 126 slightly to correct this condition which is apt to prevent operation of the reject system.

Just before the carriage reaches the location where the pin 112 encounters the strip 180, the drive sprocket 143 engages and is turned slightly by a tooth-engaging projection 210 on the upper surface of a bowed metal strip 211. The bowed strip or sprocket actuator 211 is mounted on brackets 212 on the frame of the machine so that its projection 210 engages a tooth of the sprocket 143 as the sprocket moves therepast. This turns the sprocket 143 and the entrained bevel gears slightly causing the driving gear 126 to turn. Such movement of the gear 126 ensures that the finder wheel 20 will be depressed sufficiently to establish positive electrical contact between the shaft 104 and the stop screw 119 when an unoriented peach bears against the finder wheel 20. The projection 210 and the contact strip 180 are located relatively to each other in the machine 10 so that a tooth of the sprocket 143 contacts the projection 210 at about the same instant that the pivot pin 112 engages the contact strip 180. These two members are located a short distance ahead of the transfer mechanism 22 so as to ensure energization of circuit 170 in sufficient time to disable the transfer mechanism when an unoriented fruit reaches the zone of operation of the reject system. However, if the peach is properly oriented, the finder wheel 20 will be spaced above the driving gear 126 in the position in which it is shown in FIG. 2, and movement of the gear 126 by the sprocket actuator 208 will have no effect on the finder wheel 20.

It has been found that if the flat plate 92 (FIG. 2) having the central opening 90 is made of metal, occasionally during its reciprocating vertical movement it contacts the finder arm 106 and grounds the finder arm 106 to the machine frame even though the peach in the support ring 18 is oriented. Misoperation of this kind is prevented by making the plate 92 of dielectric material such as plastic.

The switch 178 (FIGS. 1 and 5) is located adjacent the pitter mechanism 16 (FIG. 1) and is operated by lobes on a switch cam 214 secured to the pitter shaft 30, in timed relation with the advance of several carriages 12. Therefore, when an unoriented fruit has passed the transfer mechanism 22, the switch 178 is opened momentarily, breaking the holding circuit 200 and deenergizing the disabling solenoid 190 and thus restoring the reject system.

The structure of the invention described hereinabove improves the reject system used in conjunction with the transfer mechanism 22 of the fruit handling machine 10 by providing magnets rather than a spring to exert a force for raising the finder arm, by providing a nonconducting flat plate 92 which will not short out the finder arm, by providing an improved drive for the finder wheel, by providing a sprocket actuator for ensuring completion of the disabling circuit, by providing a short path for current flow through the fruit carriage which is not subject to being fouled or shorted out by corrosion or the presence of water or fruit juice, and by providing a holding circuit which prevents erratic operation of the disabling solenoid 190.

While a particular embodiment of the present invention has been shown and described, it will be understood that the apparatus is capable of modification and variation without departing from the principles of the invention and that the scope of the invention should be limited only by the scope and proper interpretation of the claims appended hereto.

The invention having thus been described, that which is believed to be new and is desired to be protected by Letters Patent is:

1. Apparatus for handling fruit having a stem indent, comprising an indent finder arranged to move into and from a position projecting into the stem indent, driving means for imparting a predetermined movement to the finder to cause the finder to scan the surface of the fruit, and magnetic means for applying a force urging said finder into said position.

2. Apparatus for handling fruit having a stem indent therein comprising, an indent finder wheel mounted for movement into and from a position projecting into said stem indent, means for rotating said finder wheel to effect scanning of the surface of the fruit, and magnetic means urging said finder wheel toward said position.

3. Apparatus for handling fruit having a stem indent, comprising a fruit carriage, a finder arm pivotally mounted on said carriage, a finder wheel rotatably mounted on said finder arm, a first magnet mounted on said finder arm, and a second magnet mounted on said carriage with its north and south poles adapted to be aligned with the south and north poles, respectively, of said first magnet when said finder wheel is within the stem indent of a fruit on said carriage, said magnets exerting a force against said finder arm to press the finder wheel against the fruit when the finder wheel is not within said stem indent.

4. Apparatus for handling fruit comprising means for supporting a fruit, fruit moving means arranged for driving engagement with a fruit supported by said supporting means for moving the fruit relatively to the supporting means and for sensing orientation of the fruit, driving means releasably connected to said fruit moving means to actuate the same, magnetic means responsive to attainment of a predetermined orientation of said fruit as determined by said fruit moving means for disconnecting said driving means from said fruit moving means, means operable to remove fruit in said predetermined orientation from said supporting means, and means operable in response to orientation of fruit otherwise than into said predetermined orientation for disabling said removing means.

5. Apparatus for handling fruit comprising movable means for supporting a fruit, means arranged for driving engagement with a fruit supported by said supporting means for moving the fruit and for sensing orientation of the fruit, driving means releasably connected to said fruit moving means to actuate the same, magnetic means responsive to attainment of a predetermined orientation of said fruit as determined by said sensing means for disconnecting said driving means from said fruit moving means, means operable to remove a fruit in said predetermined orientation from said supporting means, and means operable to prevent removal from said supporting means of a fruit disposed otherwise than in said predetermined orientation, said preventing means including a solenoid, and means operable upon energization of said solenoid for maintaining energization of said solenoid for a predetermined time.

6. Apparatus for handling indented fruit, comprising a movably mounted indent finder arranged for engagement with a fruit, driving means for imparting movement to the finder to cause the finder to scan the surface of the fruit, magnetic means operable upon registration of the indent of the fruit with the finder for disconnecting the finder from said driving means, a transfer mechanism for removing the fruit from said finder, and means for disabling said transfer mechanism including an electric circuit conditioned for energization when said finder is connected to said driving means.

7. Apparatus for handling fruit having a stem indent comprising a movably mounted indent finder arranged for engagement with a fruit, driving means for imparting movement to the finder to cause the finder to scan the surface of the fruit, means operable upon registration of the stem indent of the fruit with the finder for disconnecting the finder from said driving means, a transfer mechanism for removing the fruit from said finder, means for disabling said transfer mechanism including an electric circuit conditioned for energization when said finder is connected to said driving means, and means engageable with said driving means for advancing said driving means to ensure electrical connection between said finder and said driving means when said finder fails to register with said stem indent.

8. Apparatus for handling fruit having a stem indent comprising a movably mounted indent finder arranged for engagement with a fruit, driving means releasably engageable with the finder for imparting movement to the finder to cause the finder to scan the surface of the fruit, magnetic means operable upon registry of the stem indent of the fruit with the finder for disconnecting the finder from said driving means, a transfer mechanism for removing the fruit from said finder, means for disabling said transfer mechanism, said disabling means being dependent for its operation upon driving engagement of said finder with said driving means, and means maintaining said transfer mechanism disabled for a predetermined time.

9. Apparatus for handling fruit having a stem indent therein; comprising an indent finder wheel mounted for movement between a first position wherein said wheel projects into the stem indent and a second position wherein said wheel engages the surface of the fruit outside the stem indent; means for rotating said finder wheel for scanning the surface of the fruit; means urging said finder wheel to move to said first position; a transfer mechanism for removing said fruit from the finder; transfer mechanism disabling means comprising an electric circuit including an electric power source, a solenoid, and switch means for completing said circuit, said switch means being connected to said finder wheel to be opened thereby when the finder is in said first position; and means operable to momentarily actuate said rotating means while the finder wheel is in said second position to effect closing of said switch means.

10. Apparatus for handling fruit having a stem indent therein; comprising an indent finder wheel mounted for movement between a first position projecting into the stem indent and a second position in engagement with the surface of the fruit elsewhere than within the indent; means for rotating said finder wheel for scanning the surface of the fruit; magnetic means urging said finder wheel toward said first position; a transfer mechanism for removing the fruit from said finder; transfer mechanism disabling means comprising an electric circuit including an electric power source, a solenoid, and switch means for completing said circuit; and means connecting said switch means to said finder wheel to be opened thereby when the finder wheel moves to said first position, and means operable to momentarily actuate said rotating means while the finder wheel is in said second position to effect closing of said switch means.

11. Apparatus for handling fruit having a stem indent therein; comprising an indent finder gear mounted for movement between a first position wherein said finder gear projects into the stem indent and a second position wherein said finder gear engages the surface of the fruit outside of the stem indent; a driver gear for rotating said finder gear for scanning the surface of the fruit; means urging said finder gear to move to said first position projecting into the stem indent of the fruit; a transfer mechanism for removing said fruit from the finder gear; transfer mechanism disabling means comprising an electric circuit including an electric power source, a solenoid, and switch means for completing said circuit, said switch means being connected to said finder gear to be closed thereby when the finder gear moves to said second position; and means operable to turn said driver gear while the finder gear is in said second position to advance said driver gear to ensure meshing interengagement of said driver and finder gears and thereby ensure closure of said switch means when said finder gear is in said second position.

12. Apparatus for handling fruit having a stem indent, comprising a movable fruit carriage, a movable indent finder mounted on said carriage and arranged for engagement with a fruit, driving means releasably engageable by said indent finder for imparting movement to the finder to move the fruit engaged therewith to cause the finder to scan the surface of the fruit, magnetic means operable upon registration of the stem indent with the finder to disconnect the finder from said driving means, a transfer mechanism for removing the fruit from said fruit carriage, means for disabling said transfer mechanism including an electric circuit, a first switch means therein, means actuated by said finder wheel when the finder wheel is out of registration with the stem indent for closing said switch means to condition said circuit for subsequent energization, a second switch means in said circuit, means operable as the carriage approaches said transfer mechanism to close said second switch means and complete said circuit, and means operable as said carriage approaches said transfer mechanism to engage said driving means to advance said driving means to ensure closure of said first switch means and thereby to condition said circuit.

13. Apparatus for handling fruit having a stem indent, comprising a fruit carriage movable along a path through the apparatus, a rotatable finder wheel mounted on said carriage for movement with respect to said carriage and arranged for engagement with a fruit, a finder wheel driving means on said carriage operable to drive the finder wheel and thereby rotate the fruit engaged therewith to cause the finder wheel to scan the surface of the fruit, means operable to drive said finder wheel driving means during movement of said carriage along a first portion of said path, means operable upon registration of the stem indent with the finder wheel for moving the finder wheel into the indent and for disconnecting said finder wheel from said finder wheel driving means, a transfer mechanism located beyond said first path portion for engaging the fruit and removing it from the carriage, a transfer mechanism located beyond said first path portion for engaging the fruit and removing it from the carriage, a transfer mechanism disabling means comprising an electric circuit including two series connected switches, one of said switches being connected to said finder to be held closed thereby until the finder enters the indent of a fruit on the carriage and to be opened upon entry of the finder into the indent, and means operated by the carriage as the carriage approaches the transfer means for closing the other of said switches and thereby effecting energization of said circuit of the disabling means provided that the circuit has been conditioned for energization by closure of the finder actuated switch.

14. Apparatus for handling fruit having a stem indent comprising a fruit carriage movable along a path through the apparatus, a finder wheel mounted on the carriage for rotation and for movement into the stem indent of a fruit on the carriage, a finder wheel driving means on said carriage operable to drive the finder wheel and thereby rotate the fruit engaged therewith to cause the finder wheel to scan the surface of the fruit, means operable to drive said finder wheel driving means during movement of said carriage along a first portion of said path, means operable upon registration of the stem indent with the finder wheel for moving the finder wheel into the indent and for disconnecting said finder wheel from said finder wheel driving means, a transfer mechanism located beyond said first path portion for engaging the fruit and removing it from the carriage, a transfer mechanism disabling means comprising a solenoid, an electric circuit for energizing said solenoid while the finder wheel remains in surface scanning position during movement of said carriage through a second path portion beyond said first portion, means operably connected to said energizing circuit while said finder wheel remains in said scanning position to hold said circuit in energized condition throughout advance of the carriage along said second path portion, and means operable to engage said finder wheel driving means as said carriage moves through said second path portion for ensuring circuit energization in the event said finder wheel has not moved into the fruit stem indent.

15. Apparatus for handling fruit having a stem indent comprising a fruit carriage movable along a path through the apparatus, a finder arm, means pivotally mounting said finder arm on said carriage, a finder wheel rotatably mounted on said finder arm for movement between a first position wherein the finder wheel is in the stem indent of the fruit and a second position in engagement with the surface of the fruit outside the indent, a finder wheel driving means on said carriage operable to drive the finder wheel and thereby turn the fruit engaged therewith to cause the finder wheel to scan the surface of the fruit, means operable to drive said finder wheel driving means during movement of said carriage along an initial portion of said path, magnetic means operable upon registration of the stem indent with the finder wheel to move said finder wheel to said first position and thereby disconnect said finder wheel from said finder wheel driving means, a transfer mechanism located along said path beyond said initial path portion for removing fruit from the carriage, a contact strip in said apparatus located between said initial path portion and said transfer mechanism, a solenoid in said apparatus for disabling said transfer mechanism for preventing the transfer of fruit with stem indents not registered with said finder wheel, an electric circuit in said apparatus connected to said solenoid and energized in response to engagement of the finder arm mounting means with said contact strip while said finder wheel is in said second position, means holding said solenoid in energized condition following initial energization thereof and means operable to engage said finder wheel driving means as said carriage approaches said contact strip for ensuring circuit energization in the event said finder wheel holds said second position as the carriage moves past said contact strip.

16. Apparatus for handling fruit having a stem indent comprising a fruit carriage movable along a path through the apparatus, a ring member of electrically non-conductive material mounted on said carriage for maintaining a fruit in position thereon, a finder arm, means pivotally mounting said finder arm on said carriage, a finder wheel rotatably mounted on said finder arm for movement between a first position projecting into the stem indent of said fruit and a second position in engagement with the surface of the fruit outside the stem indent, a finder wheel driving means on said carriage operable to drive the finder wheel and thereby turn the fruit engaged therewith to cause the finder wheel to scan the surface of the fruit; means operable to drive said finder wheel driving means during movement of said carriage along a first portion of said path, a pair of magnets having their opposite poles spaced apart, one of said magnets being mounted on said finder arm and the other magnet being mounted on said carriage, said magnets exerting a force on said finder arm during its movement between said first and said second positions, said magnets being operable upon registration of the stem indent with the finder wheel to move said finder wheel to said first position and disconnect said finder wheel from said finder wheel driving means, a transfer mechanism located along said path beyond said first path portion for removing fruit from the carriage, a contact strip in said apparatus between said first path portion and said transfer mechanism, a solenoid in said apparatus for disabling said transfer mechanism for preventing transfer of fruit not registered with said finder wheel, an electric circuit in said apparatus connected to said solenoid and energized in response to engagement of the finder arm mounting means with said contact strip while said finder wheel is in said second position, means holding said solenoid in energized condition following initial energization thereof, and means operable to engage said finder wheel driving means as said carriage approaches said contact strip for ensuring circuit energization in the event said finder wheel remains in said second position as the carriage moves past said contact strip.

17. Apparatus for orienting indented fruit, comprising an indent finder wheel mounted for rotation about a horizontal axis in said apparatus and further mounted for oscillation about a vertical axis during rotation, said indent finder wheel being arranged to support a fruit by engagement with the surface thereof and for entry into the fruit indent, drive means for rotating the finder wheel to turn the fruit until the indent is in registry with the finder wheel comprising a driving gear, a first bevel gear rigid therewith mounted for rotation about a horizontal axis intersecting said vertical axis, a second bevel gear enmeshed with said first bevel gear and mounted for rotation about said vertical axis, a third bevel gear integral with said second bevel gear and mounted for rotation about said vertical axis, and a fourth bevel gear enmeshed with the third and mounted on a horizontal drive shaft, said first bevel gear rolling on said second bevel gear as the indent finder wheel oscillates about said vertical axis, and magnetic means operable when the indent registers with the finder wheel to enter the finder wheel into the indent and thus disconnect the finder wheel from said driving gear.

References Cited in the file of this patent
UNITED STATES PATENTS

| | | |
|---|---|---|
| 706,395 | Jong | Aug. 5, 1902 |
| 1,518,898 | Brunner | Dec. 9, 1924 |